though the glycidyl ethers of alcohols such as butanediol, and ether-alcohols such as polyoxyethylene glycol are contemplated by the term "glycidylether-alcohol." Glycidylether-alcohols thus include.

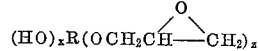

in which R must contain at least 2 carbon atoms, $x$ and $z$ must each be at least one, and R is a hydrocarbon radical having a valence of $x+z$. Advantageously R contains less than 10 carbon atoms and $z$ is less than 7, and

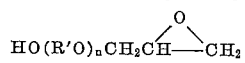

where R' is an alkylene radical having at least 2 and less than five carbon atoms, and where $n$ is an integer of less than 10.

It is not necessary that the glycidylether-alcohol contain only one glycidyl ether substituent. The diglycidyl ether of glycerol, for instance, can be used. Also suitable are the diglycidyl ether or triglycidyl ether of pentaerythritol, the diglycidyl ether of methyl glycerol, and the pentaglycidyl ether of mannitol. Partial glycidyl ethers of similar saturated alcohols are intended wherein the alcohols have not more than six hydroxyl groups and not more than ten carbon atoms.

The silicone thus can be reacted with partial glycidyl ethers of polyhydric alcohols having at least one unreacted hydroxyl group. When the glycidylether-alcohol has only one hydroxyl group, such as a monoglycidyl ether of a glycol, the resulting epoxy silicon ester will be monomeric, i.e., an unpolymerized product. However, if the glycidylether-alcohol and the silicone are both difunctional, as where the monoglycidyl ether of glycerin and a dimethoxy silane are used, linear polymeric glycidyl silicon esters are produced. By the functionality of the silicone is meant the number of groups in the silicone molecule, such as alkoxy groups, which undergo ester interchange. The functionality of the glycidylether-alcohol will be considered the number of unreacted hydroxyl groups, the epoxy groups being ignored since they do not enter into the ester interchange reaction. While linear polymers are formed when the silicone and the glycidylether-alcohol each have a functionality of two, it can be seen that if one of the components has a functionality greater than two, and the other at least two cross-linked products will be formed. If one of the components has a functionality of two and the other a functionality less than two but greater than one, low molecular weight polymeric products will be made.

The organosilicon compounds which can be used according to this invention are alkoxysiloxanes and alkoxysilanes. Aroxysiloxanes and aroxysilanes can be used in admixture therewith so long as the organosilicon contains sufficient alkoxy groups to react with the hydroxy groups of the epoxide compound. By silanes and siloxanes are intended both monomeric and polymeric compositions. Thus, diethoxyoctamethyltetrasilane is intended as well as triethylethoxysilane, and methoxypentaethyl disiloxane is intended as well as diethoxydodecylmethylhexyl siloxane. In view of the acidic nature of silanols and siloxanols, it is preferred that the silanes and siloxanes be devoid of such hydroxyl groups. The silicones should also be free of hydrogensilicon linkages. The siloxanes and silanes intended, therefore, have only hydrocarbon substituents such as aryl, or alkyl groups in addition to at least one alkoxy substituent. These are most conveniently characterized as

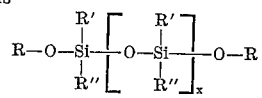

wherein R is an alkyl radical containing from one to four carbon atoms, R' and R" are an alkyl, alklene (vinyl), aryl, aralkyl, cycloalkyl, aroxy or alkoxy radical, and wherein x is 0 or at least one. Preferred silanes and siloxanes are Dimethyldiethoxysilane $(C_2H_5O)_2Si(CH_3)_2$ Ethoxypentamethyldisilane $(C_2H_5OSi(CH_3)_2Si(CH_3)_3)$ Tetraethoxydiethyldimethyltrisilane $[(C_2H_5O)_2Si(C_2H_5)Si(CH_3)_2Si(OC_2H_5)_2(C_2H_5)]$ Diethyltetramethyldisiloxane $[C_2H_5O((CH_3)_2SiO)_2C_2H_5]$ Diethoxyhexamethyltrisiloxane $[C_2H_5O((CH_2)_2SiO)_3C_2H_5]$ Diethoxyoctamethyltetrasiloxane $[C_2H_5O((CH_3)_2SiO)_4C_2H_5]$ Diethoxydecamethylpentasiloxane $[C_2H_5O((CH_3)_2SiO)_5C_2H_5]$ Diethoxydodecamethylhexasiloxane $[C_2H_5O((CH_3)_2SiO)_6C_2H_5]$ and Dimethyltriphenyltrimethoxytrisiloxane

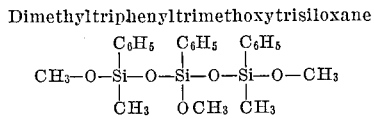

commercially available as "Sylkyd 50."

Other silanes and siloxanes contemplated are butoxyethoxydiethylsilane, ethyltrimethoxysilane, propoxyethoxydiphenylsilane, propylethoxydimethylsilane, diethoxytetraethyldisilane, hexapropoxydisilane, diethyldiphenyldipropoxydisilane, benzylethylpropoxydisilane, pentaphenylethoxydisilane, diethoxyhexaethyltrisilane, octabutoxytrisilane, dipropoxyoctaphenyltetrasilane, tetramethoxyoctaethylpentasilane, ethoxypentamethyldisiloxane, tetramethyldiethoxydisiloxane, tetraphenyldimethoxydisiloxane tetrabenzyldibutoxydisiloxane, hexaethoxyhexamethyltrisiloxane, decamethoxytetrasiloxane, and the like. It is preferred that each hydrocarbon or alkoxy substituent have twelve or less carbon atoms.

Siloxane rings produced by the condensation of organosilanediols are also included, for instance,

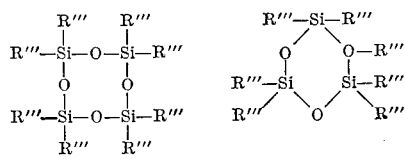

and

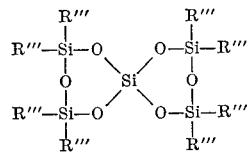

where each R''' is an alkyl, aryl, aralkyl, cycloalkyl, aroxy or alkoxy radical, at least one R''' being an alkoxy group.

In preparing the epoxy-silicon compositions, the silicone and the glycidylether-alcohol are heated at a temperature sufficiently high to give a homogeneous molten mass. While not necessary, the presence of a catalyst is generally desired, and the alcohol produced as a by-product is removed from the mixture by such means as distillation. Catalysts appropriate for the reaction are alcoholysis catalysts. Those catalysts which increase the rate of esterification are alkali metals as lithium, sodium and potassium. Titanate catalysts can also be used. Such titanium catalysts are octylene glycol titanate, triethanol amine titanate, titanium stearate, and titanium oleate, especially tetraisopropyl titanate, tetra-n-butyl titanate and tetrastearyl titanate. Small quantities of carboxy copolymers can also be used. Such copolymers are acrylic acid with styrene and methyl methacrylate. Any of the carboxy copolymers described in U.S. 2,931,742 can be used.

The process proceeds with no particular difficulty except that since the reaction is reversible, the alcohol produced as a by-product should be removed as the reaction progresses. The temperature is normally between 50° C. and 250° C., with 100° C. to 150° C. as the preferred range. There is generally no advantage in using more than 2 percent of the catalyst, and usually 0.1 to 5 percent is sufficient. The invention can perhaps better be understood by reference to the following examples.

*Example 1*

62.4 grams of a crude monoglycidyl ether of ethylene glycol having a weight per epoxide of 135, 85.8 grams of dimethyltriphenyltrimethoxytrisiloxane, and 3 grams of tetraisopropyl titanate are combined in a 500 ml. distillation flask equipped with condenser, thermometer, and stirrer. During the reaction, nitrogen is passed through the system and the flask contents are stirred constantly. The reactants are heated at 99° C. to 108° C. for approximately two hours with some material slowly distilling over. A partial aspirator vacuum is applied as heating is continued for an additional half-hour, the total distillate collected in the receiving flask weighing 12.1 grams. The hydroxyl content of the remaining material is substantial as shown by the infrared spectrum, indicating incomplete reaction. Hence, the reaction is allowed to proceed at a pressure of 110 to 112 mm. Hg and at a temperature varying from 102° C. to 111° C. for one and one-half hours or unitl the infrared spectrum of the pot residue shows only a trace of hydroxyl. The residue is the product having a weight per epoxide of 341, a viscosity (Gardner-Holdt) of E to F, and a color (Gardner-Holdt) of 3.

*Example 2*

The monoglycidyl ether of 1,4-butanediol having a weight per epoxide of 146 is reacted with dimethyltriphenyltrimethoxytrisiloxane according to the procedure described in Example 1. The product has a weight per epoxide of 312, a viscosity (Gardner-Holdt) of A to $A_1$, and a color (Gardner-Holdt) of 3.

*Example 3*

Following the procedure used in the previous examples, 102 gms. of the diglycidyl ether of trimethyol propane having a weight per epoxide of 164 are reacted with 98 gms. of dimethyltriphenyltrimethoxytrisiloxane in the presence of 2 gms. of a polycarboxy copolymer catalyst, the composition of which is: vinyl toluene, 72 percent; methyl methacrylate, 20 percent; acrylic acid, 8 percent; acid value based on solids, 62. The reaction is carried out at a temperature of 150° C. until no more distillate comes over (about seevn hours). The filtered product has a weight per epoxide of 308, a viscosity (Gardner-Holdt) of S to T, and a color (Gardner-Holdt) of less than one.

*Example 4*

The diglycidyl ether of hexanetriol having a weight per epoxide of 179 is substituted in place of the diglycidyl ether of trimethylol propane in Example 3 and reacted with dimethyltriphenyltrimethoxytrisiloxane using the amounts and procedure set forth in Example 3. The product obtained has a weight per epoxide of 349, a viscosity (Gardner-Holdt) of U to V, and a color Gardner-Holdt) of 5 to 6.

*Example 5*

The partial glycidyl ether of trimethylol propane prepared by reacting 1.2 mols epichlorhydrin with 1 mol trimethylol propane and having a weight per epoxide of 219 is reacted with dimethyldiethoxysilane. A mixture of 74 gms. of the silane and 104 gms. of the glycidyl ether are placed in the flask fitted with thermometer, stirrer, and reflux condenser, and nitrogen is passed through the system. After 5 mls. of tetraisopropyl titanate are added, the solution is refluxed (101° C.) for two hours. An addition of 74 gms. of the dimethyldiethoxysilane is made and the solution is refluxed for another hour. Then the condenser is arranged for distillation and the solution is distilled to a pot temperature of 172° C. and a head temperature of 80° C. to remove the volatile material. A product is obtained having a weight per epoxide of 286, a viscosity (Gardner-Holdt) of Y.

*Example 6*

A solution of 55 gms. of the partial glycidyl ether of trimethylol propane of the same composition as that used in Example 5 with a weight per epoxide of 219, 222 grams dimethyldiethoxysilane, and 5 mls. tetraisopropyl titanate is refluxed for three hours. The flask contents are then subjected to distillation at atmospheric pressure, and at a temperature up to 160° C. under which conditions a total of 70 gms. of distillate are collected. An additional 25.5 gms. of distillate is collected under water aspirator vacuum and a temperature of 150° C. Another 55-gm. portion of the glycidyl ether is added and heated at 170° C. under vacuum for two hours. Methyl isobutyl ketone, 150 mls., and a filter aid are added. The product after being filtered has a percent solids of 48.1 and a weight per epoxide of 272.

I claim:
1. An epoxy silicon compound obtained by ester interchange between an alcoholic hydroxyl group in
   (A) a partial glycidyl ether of a polyhydric alcohol, having one unreacted alcoholic hydroxyl group, selected from the group consisting of the monoglycidyl ether of ethylene glycol, the monoglycidyl ether of 1,4-butanediol, the diglycidyl ether of trimethylolpropane and the diglycidyl ether of hexanetriol,
   and an alkoxy group in
   (B) an alkoxy silicon compound selected from the group consisting of alkoxy siloxanes and alkoxy silanes, said alkoxy silicon compound being one which:
     (1) contains only carbon, hydrogen, oxygen and silicon,
     (2) is free of acidic hydroxyl groups,
     (3) is free of hydrogen-silicon linkages, and
     (4) has only hydrocarbon substituents, at least one of which is an alkoxy group, alkoxy groups being the only substituents of said alkoxy silicon compound which are reactive with alcoholic hydroxyl groups.
2. An epoxy silicon compound as described in claim 1 wherein said (A) is the monoglycidyl ether of ethylene glycol.
3. An epoxy silicon compound as described in claim 1 wherein said (A) is the monoglycidyl ether of 1,4-butanediol.
4. An epoxy silicon compound as described in claim 1 wherein said (A) is the diglycidyl ether of trimethylolpropane.
5. An epoxy silicon compound as described in claim 1 wherein said (A) is the diglycidyl ether of hexanetriol.
6. An epoxy silicon compound as described in claim 1 wherein said (B) is dimethyltriphenyltrimethoxytrisiloxane.
7. An epoxy silicon compound as described in claim 1 wherein said (B) is dimethyldiethoxysilane.

References Cited

UNITED STATES PATENTS

| | | | |
|---|---|---|---|
| 2,730,532 | 1/1956 | Martin | 260—348 |
| 2,843,560 | 7/1958 | Mika | 260—348 |
| 3,150,116 | 9/1964 | Masters | 260—824 |
| 3,154,597 | 10/1964 | McWhorter | 260—824 |
| 3,170,962 | 2/1965 | Tyler | 260—824 |
| 3,220,878 | 11/1965 | Pines | 260—824 |

FOREIGN PATENTS

| | | |
|---|---|---|
| 788,074 | 12/1957 | Great Britain. |
| 1,069,625 | 11/1959 | Germany. |

OTHER REFERENCES

Silicones, Meals et al., Reinhold Publishing Corp., New York, 1959, page 6.

DONALD E. CZAJA, *Primary Examiner.*

LEON J. BERCOVITZ, M. I. MARQUIS,
*Assistant Examiners.*